United States Patent Office 3,278,202
Patented Oct. 11, 1966

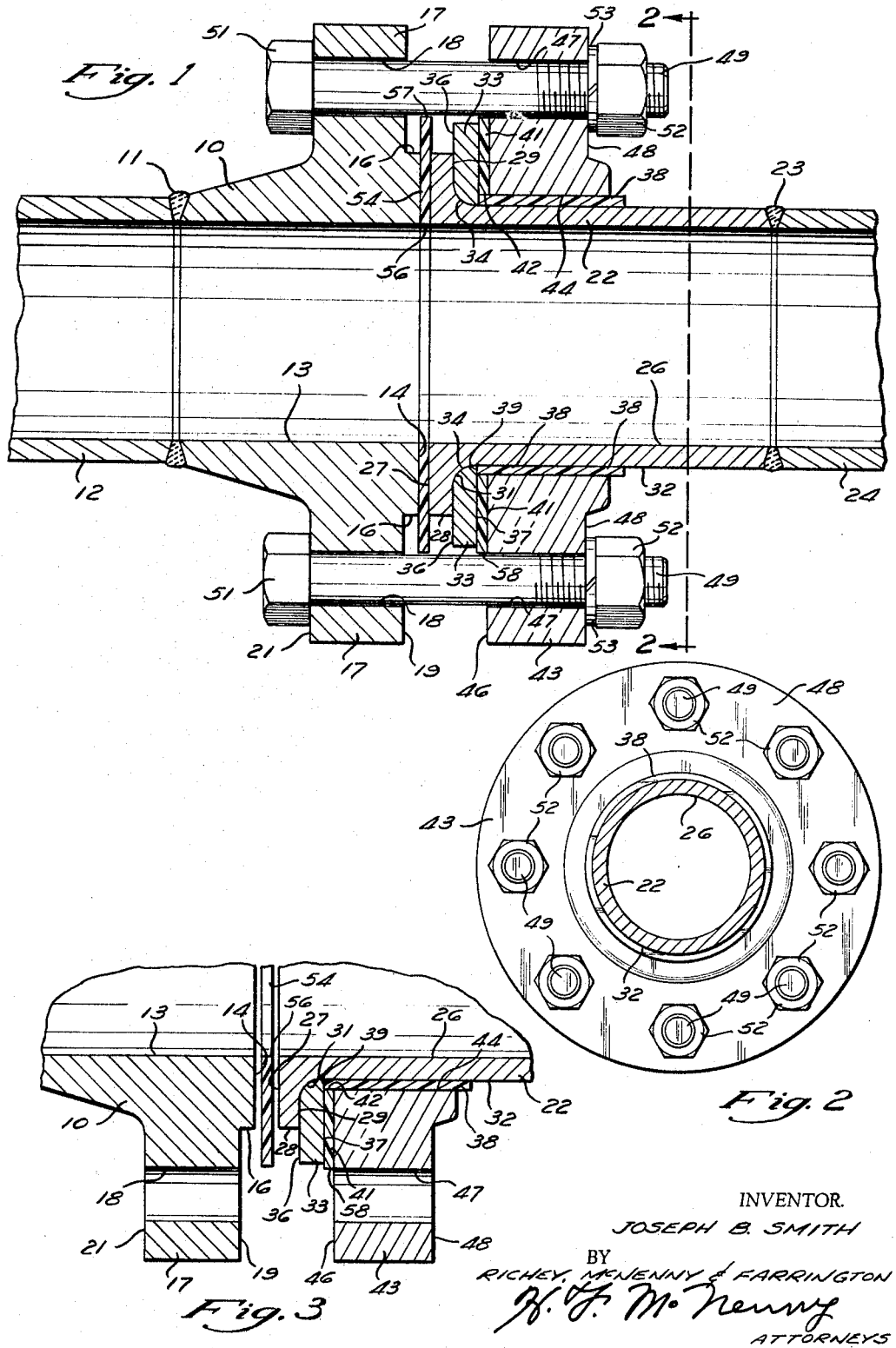

3,278,202
INSULATED PIPE JOINT
Joseph B. Smith, 5350 W. 130th St., Cleveland, Ohio
Filed May 14, 1964, Ser. No. 367,299
1 Claim. (Cl. 285—50)

This invention relates generally to pipe couplings and more particularly to a novel and improved electrically insulated pipe coupling adapted to impede flow of electrolytic currents in a pipe line system.

Stray electrical currents are generated along a pipe line or any piping system by various means. Dissimilarity of metals or of soils create a galvanic reaction constituting a weak battery which generates an electric current. These currents travel along a pipe and as they travel may increase the strength. Eventually the pipe passes through an area where the electrical potential is higher than its surroundings. The electric current then flows from the pipe to the lower potential contact. The current flow from the pipe results in ionization causing molecules of iron to depart and results in corrosion or rust holes.

Insulating flanges or couplings are employed to electrically isolate pipe sections so that the current flow may be maintained within acceptable limits that will inhibit corrosion. In some instances cathodic protection is also used to prevent corrosion. Such protection provides means for increasing the electrical potential of areas surrounding the pipe so that the current flows to the pipe rather than away from it. Here again, with such cathodic protection insulating flanges or couplings are important to isolate the section of the pipe which is to be protected from corrosion.

One of the more common insulated pipe couplings which has been used in the past to inhibit current flow along pipe lines is provided with two flanges separated by an insulating gasket and separate insulating sleeves and insulating washers for each of the bolts connecting the flanges. Such insulating couplings are extremely difficult to assemble in the field because they require numerous insulating elements and damage to any one of the insulating elements completely defeats the insulating properties of the coupling. Also, the fact that each bolt is individually isolated by its own insulating elements introduces problems in connection with the tightening of the bolts since any uneven torquing of a bolt may place excessive loads on the individual associated insulating elements and may result in failure of such elements.

In an insulating pipe line coupling incorporating my invention only three insulating elements are required. Therefore, the field installation of the coupling is tremendously simplified and the possibility of damage to the insulating elements is greatly reduced. Also, the structure is arranged so that any unevenness in the torquing of the individual bolts does not cause concentrated excessive loading on any zone of the insulating elements which could produce failure of the insulating properties of the assembled coupling.

It is an important object of this invention to provide a novel and improved insulating coupling for pipe lines and the like which can be easily assembled in the field without damaging the insulating elements.

It is another object of this invention to provide a novel and improved insulating coupling for pipe lines and the like wherein a minimum number of insulating elements are required to provide full electrical insulation of the assembled device.

It is another important object of this invention to provide a novel and improved flanged insulated pipe coupling wherein one of the flanges can be swivelled about the central axis of the coupling to facilitate alignment of the bolt holes.

It is still another object of this invention to provide a novel and improved insulated pipe coupling arranged so that the insulating elements of the coupling are protected against high localized stresses.

It is still another object of this invention to provide a novel and improved insulated pipe coupling having a thrust insulating member and an insulating gasket wherein the elements are arranged so that the thrust element load does not exceed the insulating gasket load.

Further objects and advantages will appear from the following description and drawings wherein;

FIGURE 1 is a side elevation in longitudinal section illustrating the structure of a preferred form of my invention in the assembled position;

FIGURE 2 is an end view taken along 2—2 of FIGURE 1; and

FIGURE 3 is the fragmentary longitudinal section illustrating the elements prior to assembly.

In the illustrated embodiment of this invention a first flange member 10 is welded at 11 to the end of one part 12 of a pipe line. The flange member 10 provides a central bore 13 having a diameter equal to and aligned with the pipe line end 12 and a sealing face 14 extending radially from the bore 13 to an axially extending cylindrical surface 16. A bolt flange 17 extends radially from the cylindrical surface 16 and is provided with a plurality of symmetrically spaced bolt holes 18 each extending parallel to the axis of the bore 13. The forward face 19 of the flange 17 is spaced back from the sealing face 14 and the rearward face 21 extend perpendicular to the axis of the bolt holes 18 so that the heads or nuts of the bolts will be provided with a proper seat.

A stub end 22 is welded at 23 to the end of the other part of the pipe line 24 and is provided with a through bore 26 having a diameter equal to the inner diameter of the pipe end 24. A radial sealing face 27 extends radially from the bore 26 at the forward end of the stub end to a cylindrical surface 28 having a diameter equal to the diameter of the cylindrical surface 16. A rearward face 29 extends radially inward from the cylindrical surface 28 to a concave radius 31 which joins with the outer cylindrical surface 32 of the stub end.

A thrust washer 33 is formed with a convex radius 34 proportioned to closely fit the concave radius 31 and a forward radial surface 36 proportioned to fit against the rearward face 29 of the stub end 22. When the thrust washer 33 is in the position its rearward face 37 extends perpendicular to the central axis of the coupling from the cylindrical surface 32 and cooperates therewith to produce a right angle intersection.

An insulating sleeve 38 is proportioned to fit over the outer cylindrical surface 32 and preferably abuts against the rearward surface 37 at its forward end 39. A thrust insulating member 41 seats against the rearward surface 37 of the thrust washer 33 and is provided with a bore 42 proportioned to receive the forward end of the insulating sleeve 38.

A flange collar 43 is provided with an internal bore 44 proportioned to fit over the insulating sleeve 38 so that the flange 43 is radially located by the sleeve 38. A forward face 46 is perpendicular to the central axis of the coupling and engages the rearward side of the thrust insulating member 41. The flange collar 43 is formed with bolt holes 47 symmetrically spaced therearound and matching corresponding bolt holes 18 in the bolt flange 17. The rearward face 48 of the flange collar 43 is radial so that the heads or the nuts of the bolts are provided with a proper seat.

A plurality of bolts 49 extend through the bolt holes formed in the bolt flange 17 and flange collar 43 with their heads 51 against the face 21. Nuts 52 and lock washers 53 seat against the face 48. Positioned between the sealing faces 14 and 27 is an insulating gasket 54 which is engaged on opposite sides by the sealing faces. The insulating gasket 54 is formed with a central opening 56 having a diameter equal to the diameter of the bores 13 and 26 and an outer cylindrical surface 57 having a diameter slightly less than the diameter of the radially inner sides of the bolts 49 when they are in the assembled position. Therefore, the gasket 54 extends radially beyond the two cylindrical surfaces 16 and 28 as illustrated to provide a maximum path to resist electrical flow through the surrounding soil and also so that the gasket will be radially located by the bolts during assembly to insure that the central aperture 56 is properly positioned with respect to the bores 13 and 26. Similarly the outer surface 58 of the insulating thrust member 41 has a diameter substantially equal to the inner sides of the bolts 49 and the sleeve 38 extends rearwardly beyond the collar 43 so that a maximum leakage path will be provided to resist electrical currents.

Preferably, the insulating sleeve 38, the insulating thrust element 41 and the insulating gasket 54 are all formed of the same material which may be a phenolic or melamine resin impregnated fiber, or any other dielectric of high compressive strength which is water and oil resistant. Satisfactory results have also been obtained with a laminated plastic manufactured by the General Electric Company under the trademark Textolite, Grade No. 11,563, which is rated at 41,300 p.s.i. face compressive strength. It should be understood that the above examples of insulating material are only given by way of example and that other suitable insulating materials can be used.

Preferably, the insulating members are one piece members and the sleeve 38 and member 41 are merely slipped over the stub end 22 before installation. However, if desired, the insulating member 41 may be segmented and provided with a bevel end or a lap joint so that it may be positioned in the assembly after the weld 23 is made. Similarly, the sleeve 38 may be segmented for the same reason.

The thrust washer 33 provides substantial support for the flange collar 43 and the insulating thrust member 41 and is preferably proportioned so that the area of engagement with the insulating thrust member 41 is at least equal to the area of the sealing faces 14 and 27. With such an area relationship the pressure on the thrust member 41 will not exceed the pressure of the insulating gasket 54. Because the tension of the bolts 49 is applied through the flange collar 43 damage to the insulating material will not occur even if one of the bolts is excessively torque since such excessive pressure will be distributed over a substantial area.

The illustrated insulating coupling also has the advantage of permitting swivelling of the flange collar 43 to provide proper alignment of the bolt holes 47 with the bolt holes 18. Because only three insulating members are provided and because they are relatively large it is easy to provide field assembly of the coupling and the danger of insulation damage is minimized. Also, by arranging the sleeve 38 so that it extends underneath the thrust insulating member 41, as illustrated, proper insulating properties will be provided even if the sleeve 38 does not extend into abutting relation with the thrust washer 33 so long as it extends into the central bore 42 of the member 41.

Although a preferred embodiment of this invention is illustrated, it is to be understood that various modifications and rearrangements of parts may be resorted to without departing from the scope of the invention as defined in the following claim.

What is claimed is:

An insulated pipe joint comprising first and second tubular coupling assemblies, said first assembly having a radially extending bolt flange having a plurality of axial bolt holes therethrough at a uniform radius from the axis of the coupling, said first coupling assembly having a raised planar sealing face projecting axially beyond said bolt flange and having an outer periphery a spaced distance inward from said bolt holes, said second assembly having a planar sealing face in alignment with and having the same area as said sealing face on said first assembly and terminating outwardly in an outer periphery having substantially the same diameter as the outer periphery of said sealing face of said first assembly, said second assembly having a cylindrical surface and a radial surface extending from the end of said cylindrical surface adjacent to and a spaced distance from the sealing face on said assembly, a thrust washer with one side against said radial surface and extending radially therebeyond, an insulating sleeve around said cylindrical surface having one end adjacent the other side of said thrust washer, an annular insulating thrust element positioned with one face against said other side of said thrust washer and an inner surface against the outer surface of said insulating sleeve, a tubular collar having an inner surface positioned against the outer surface of said insulating sleeve and an end surface positioned against the other side of said annular insulating thrust element, a plurality of bolt holes in said collar in alignment with the bolt holes in said flange, a plurality of bolts extending through said bolt holes on said flange and said collar to press said collar toward said flange, an annular insulating gasket between said sealing faces and extending radially beyond the outer periphery of said sealing faces to have an outer diameter slightly less than that of the inner sides of said bolts whereby said bolts position said gasket against radial movement, said annular thrust element also having an outer diameter slightly less than that of the inner edges of said bolts, the area of said annular insulating thrust element in compression between said collar and said thrust washer being at least as great as the area of said insulating gasket in compression between said sealing faces, said gasket and said insulating sleeve and said annular insulating thrust element being formed of a high compression strength resin impregnated fiber.

References Cited by the Examiner

UNITED STATES PATENTS

| | | | |
|---|---|---|---|
| 1,186,325 | 6/1916 | Metzger | 285—412 |
| 2,465,669 | 3/1949 | Tudor | 285—48 |
| 2,653,834 | 9/1953 | Purkhiser | 285—50 |
| 3,135,538 | 6/1964 | George | 285—422 |
| 3,156,489 | 11/1964 | Deringer | 285—114 |

FOREIGN PATENTS

| | | |
|---|---|---|
| 1,047,939 | 7/1953 | France. |
| 915,065 | 1/1963 | Great Britain. |
| 942,777 | 11/1963 | Great Britain. |

CARL W. TOMLIN, *Primary Examiner.*

EDWARD C. ALLEN, *Examiner.*

R. A. GIANGIORGI, *Assistant Examiner.*